United States Patent [19]

Matava et al.

[11] Patent Number: 5,280,158
[45] Date of Patent: Jan. 18, 1994

[54] CONTROLLER FOR ELECTRIC HEATERS FOR INTERNAL COMBUSTION ENGINE

[76] Inventors: Stephen J. Matava, 300 123rd Pl. NE., Bellevue, Wash. 98005; Timothy Matava, 2828 Camp St., New Orleans, La. 70115

[21] Appl. No.: 876,968

[22] Filed: May 1, 1992

[51] Int. Cl.$^5$ .............................................. H05B 1/02
[52] U.S. Cl. .................... 219/492; 219/486; 219/494; 219/497; 219/202; 219/205; 123/142.5 R
[58] Field of Search ............... 219/490, 494, 497, 499, 219/501, 492, 505, 202, 203, 204, 506; 123/179 BG, 179 H, 142.5 R, 142.5 E

[56] References Cited

U.S. PATENT DOCUMENTS

| | | |
|---|---|---|
| 2,654,826 | 10/1953 | Spurlin . |
| 3,213,994 | 10/1965 | Hohler . |
| 3,469,072 | 9/1969 | Carlson . |
| 3,740,564 | 6/1973 | Wong . |
| 3,798,072 | 3/1974 | Anderson . |
| 3,870,855 | 3/1975 | Edlund et al. . |
| 4,461,951 | 7/1984 | Luoma, II et al. ................ 219/497 |
| 4,570,054 | 2/1986 | Chidzey et al. .................... 219/497 |
| 4,642,154 | 2/1987 | Thalmann et al. .................. 219/497 |
| 4,642,155 | 2/1987 | Ramsey ............................. 219/497 |
| 4,668,856 | 5/1987 | Axelson ............................. 219/497 |
| 4,700,052 | 10/1987 | Wolf et al. ........................ 219/497 |
| 4,770,134 | 9/1988 | Foreman et al. . |
| 5,012,070 | 4/1991 | Reed . |

Primary Examiner—Mark H. Paschall

[57] ABSTRACT

This invention pertains to a controller for electric heaters for preheating temperature sensitive components of internal combustion engines operating in very cold climates. The controller reduces energy consumption by turning on the engine component heater no sooner than necessary for the object to achieve the desired temperature. The device monitors ambient air temperature and when it is cold enough, projects the rate of the change of temperature forward to predict the temperature at the time the engine must next be started. Using manufacturers' heater specifications, the air temperature ambient to the engine components and an heating function derived from heat conduction theory, the device calculates the amount of time required for heating the engine components and turns on the heater when the appropriate time arrives. For vehicles going into service on fixed daily schedules, the controller automatically controls the start and duration of heating without user intervention for both daily and weekend schedules.

A key pad and display panel allow entry and verification of data for each heater, including desired use time(s) for each day of the week, vehicle/heater circuit identification, and the heating time parameter for the engine/heater.

10 Claims, 5 Drawing Sheets $t_c$=Current Time to Next Use
Temp.=Temperature $t_e$ = Engine Component Heating Time
$t_c$ = Current Time to Next Use

CONTROLLER FOR ELECTRIC HEATERS FOR INTERNAL COMBUSTION ENGINE

BACKGROUND OF INVENTION

This invention pertains for device which control the application of electric energy to heaters that preheat temperature sensitive engine components such as the engine block, the engine oil/transmission and the battery of internal combustion engines before starting after they have been exposed to temperatures that may range to −60 degrees Fahrenheit. Specifically, with a knowledge of the next use time of a vehicle, this invention automatically controls the initiation and duration of engine component heating such that significant savings in energy consumption are realized when compared to existing the methods of preheating engines in cold climates.

The manufacturers of engine component heaters publish recommended combinations of heaters for each available engine size, crankcase oil/transmission type and battery size for private and most commercial vehicles. These heaters are manufactured for the specific application in which heat energy is conducted from the point of component contact with the heater throughout the component with the maximum temperature of the component being reached after approximately five hours of heating. These heaters are also manufactured to standards such that, when properly installed, the maximum temperature of the component being heated does not exceed a temperature which will lead to damage of the component even when heating is continuous or when ambient temperatures exceed those that would normally require heating of the engine components before use.

In the typical daily use cycle of vehicles during the winter in very cold climates, vehicles are not in continuous use for 24 hour periods. Therefore, after a time period in which the vehicles are not in use and exposed to cold ambient temperatures, the engine components of the vehicle will have to be electrically heated before next use. For example, the heaters may be turned on at the end of the day and left on all night so that the components will be warm enough to start in the morning. However, since only a maximum of five hours is typically required to heat the components to their maximum temperature, leaving the heaters on all night wastes a substantial amount of electrical energy even at the lowest expected ambient temperature of the region.

The present art adds a timer or clock between the energy source and the component heaters to reduce energy consumption and engine wear when the desired engine component temperatures are not required until hours or days after the heater is set up. The timer or clock is manually set to supply energy to the component heaters at a time in the future which is long enough before the desired use time of the vehicle to give the user some confidence that the engine components will be heated sufficiently to enable starting. Examples of such clock or timer switched controllers which may be used for engine heaters are contained in U.S. Pat. Nos. 3,213,994 (Hohler), 3,740,564 (Wong) and 3,870,855 (Edlund et al.). These applications manually set the clock or timer to start component heating easily enough so that the user has some confidence that the components will be warmed sufficiently at the time of next use, given the ambient temperature at next use time. The ambient temperature available to the user will normally be a weather bureau forecast which at best is an area estimate which may differ significantly from the local temperature at the time of next use, especially if the weather bureau estimate is for a 24 hour or longer period of time.

In the present art, the length of time that electrical energy is applied to the heaters is an estimate made by the user and not on a computation based on manufactuer's specifications for the components being heated. If the future temperature is milder than predicted, then energy will be wasted because the clock or timer initiates heating sooner than necessary. Or, if the the length of time for heating was not set conservatively, the engine components will not be heated sufficiently at the desired time to allow starting without excessive engine wear.

The present art requires manual adjustment of the start and duration of heating time to account for daily temperature changes. Automatic methods to accomplish engine heating before next use time on a daily basis with confidence that the engine components will be adequately heated are not presently available in the art. Furthermore, the general user does not have access to the manufacturers' heater data nor the knowledge of large object heat conduction dynamics. The random approach to heating engine components employed by the present art leads to the inefficient use of electrical energy, hard starting and/or excessive engine wear during starting.

SUMMARY OF THE INVENTION

The principal object of this invention is to decrease component heater electrical energy consumption by delaying the application of energy to the component heaters as long as possible while ensuring that components will have reached an acceptable temperature at the time the vehicle is to be next used. This object is obtained by automating, with the use of a computer and custom software, the measurement of the ambient air temperature and the calculation of time required to properly heat an engine component given the measured ambient temperature. This invention utilizes a clock and a means for switching the power on to the heaters at the proper time for the correct length of heating.

The word "heaters" will, in the text of the following description, refer to the engine component heaters of a vehicle, which may be either an engine block contact heater or a coolant heater, and any combination of engine oil heater, transmission fluid heater and battery heater.

The time required to properly heat a component is determined from manufacturer's specifications for the heater/component application and the proper application of the theory of heat conduction. FIG. 3 illustrates the theory of heat conduction as applied to the heating of an object between the initial and final temperature of the object. This may be expressed as $$T(t) = T_F - (T_F - T_I) e^{-\frac{t}{\tau}},$$

where T(t) is the average temperature of the object at time t, $T_F$ and $T_I$ are the final and initial temperatures of the object respectively and $\tau$ is the object heat conduction time constant. It is important to note that this method for determining the temperature of the object being heated does not place any temperature measurement devices directly on or in the engine component being heated; consequently, the heating control is accomplished based on time in an open loop configuration.

Our invention also takes into account the possibility of relatively rapid changes in ambient air temperatures. This is done by computing the temperature expected at the next use time of the vehicle. The expected temperature at next use time is updated periodically to support component heating time computations.

Another object of this invention is to control simultaneously numerous engine component heaters for many private or commercial vehicles. The architecture of the preferred embodiment of this invention shows a microprocessor/memory configuration, a user means for data entry and display, a temperature sensing device independent of the number of engine components to be heated. This embodiment also shows a number of identical, independent current switching channels, one to each heater, such that the number of current switching channels can be adapted to the number of independent engine components to be heated. Also, the current switching design of this invention accommodates the energy requirements for a wide range of heaters now in use on or for vehicles in commercial as well as residential use.

For vehicles that go into service each day on a fixed time schedule, our invention retains the vehicle time of next use in memory after termination of heating and while the vehicle is in service. The user then simply reconnects a vehicle to the same controller terminals at the end of the service each day, including weekends, without requiring an additional data input to the controller. Of course, the user may wish to change the time of next use and can do so any time prior to the time the connected vehicle enters the heating phase.

As a further advantage, our invention electrically isolates current heater switching circuits from the low energy level microprocessor computation, memory and control circuits.

DESCRIPTION OF THE PREFERRED EMBODIMENT

Figure 1:
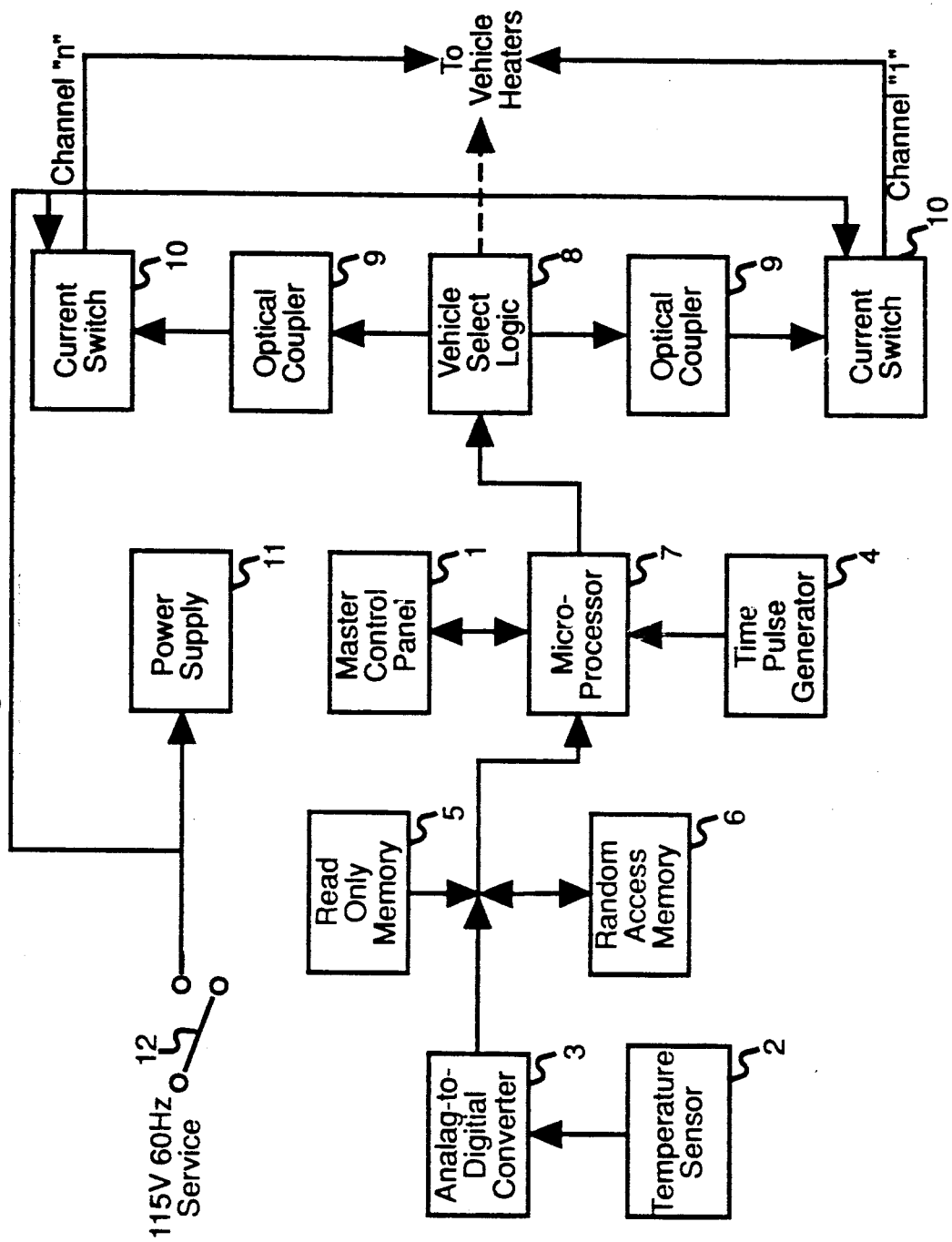
FIG. 1 shows a functional block diagram of the controller.

FIG. 1 shows the preferred embodiment of the controller. The controller includes master control panel 1 with a key pad for energy of variable data into the controller for each function to be programmed. Local time data is stored in a reserved RAM 6 location. Data such as next use time and heater parameters which are entered for each designated vehicle are stored in reserved RAM 6 locations according to vehicle number. A display is included on the master control panel 1 which allows the user to view and verify the data being entered into the system. Data that may be entered and displayed on the master control panel 1 include: local time, designation of the vehicle whose components require heating, the next use time for the vehicle and heater parameters. System controls for power on/off, data entry/display, data entry complete and test are also located on the master control panel 1.

The controller includes a temperature sensor 2 which, in the preferred embodiment, is mounted on the controller to measure the ambient temperature. In an alternate embodiment, the sensor could be located off the controller without affecting the spirit and scope of the invention.

An analog-to-digital converter 3 changes the analog temperature sensor output to a digital format compatible with the microprocessor 7.

The time pulse generator 4 provides the basic timing reference for the controller. The pulse from the generator is transmitted to the microprocessor 7 at regular time intervals to service the system clock. Internal timing markers are derived from the system clock. These markers control time intervals for storage of temperature measurements and computation of current time to next use, expected temperature at next use time and duration of component heating time.

The read-only-memory (ROM) 5 stores the operational program executed by the microprocessor to control system operations, permanent data files and computation routines.

The random access memory (RAM) 6, shown as a separate modulate in the preferred embodiment, stores in-process data such as computational results, a temperature measurement file or array for expected temperature computations, local time and vehicle/heater-specific data file. Alternate embodiments are possible that could include all or part of the RAM 6 on the same chip with the microprocessor 7.

The microprocessor 7 executes the controller operational program. Although the preferred embodiment shows a microprocessor, it is well known in the field that alternative designs could be implemented with discrete logic, programmable gate arrays and math chips in place of the microprocessor.

When the controller is designed to control the heaters for one vehicle, the microprocessor 7 is connected directly to an optical coupler 9. If the controller is designed to control heaters for numerous vehicles independently, then independent optical couplers and current switches are required for the heaters of each vehicle. Selection logic 8 is interposed between the microprocessor 7 and the optical couplers, 9, as shown in FIG. 1. An advantage of this approach is that all the components for the single heater or the multi-heater configuration can be the same except for the select logic 8. The output of each optical coupler acts on the gate of a current switch 10 capable of switching bi-directional current with sufficient wattage capacity to power the heaters in most residential and commercial vehicles. In an alternative embodiment, the optical coupler 9 and the current switch 10 can be located remotely from the controller.

In the preferred embodiment of this invention, the optical coupler 9 provides the means for decoupling the low energy digital processing grounds or electrical returns from the high energy power supply and heater current grounds. Decoupling is accomplished by the photon transfer link within the optical coupler 9 which provides signal isolation between the input signal from the selection logic 8 and the output signal to the gate of the current switch 10. Additionally, the optical coupler 9 output circuitry switches gate of the current switch 10 to zero only when the current magnitude of the power supply approaches zero. This reduces the possibility of generating large voltage spikes in the low energy computing circuits and interference coupling to other external building circuits during switching.

The digital system power supply 11 and the current switches 10 are powered from the same external, domestic power supply. The power supply 11 also includes a backup battery that is continuously charged as long as the controller is connected to the external power supply. This battery provides a short term power source for the microprocessor and digital components during interruptions of the normal power supply.

OPERATION OF THE PREFERRED EMBODIMENT

Figure 2A:
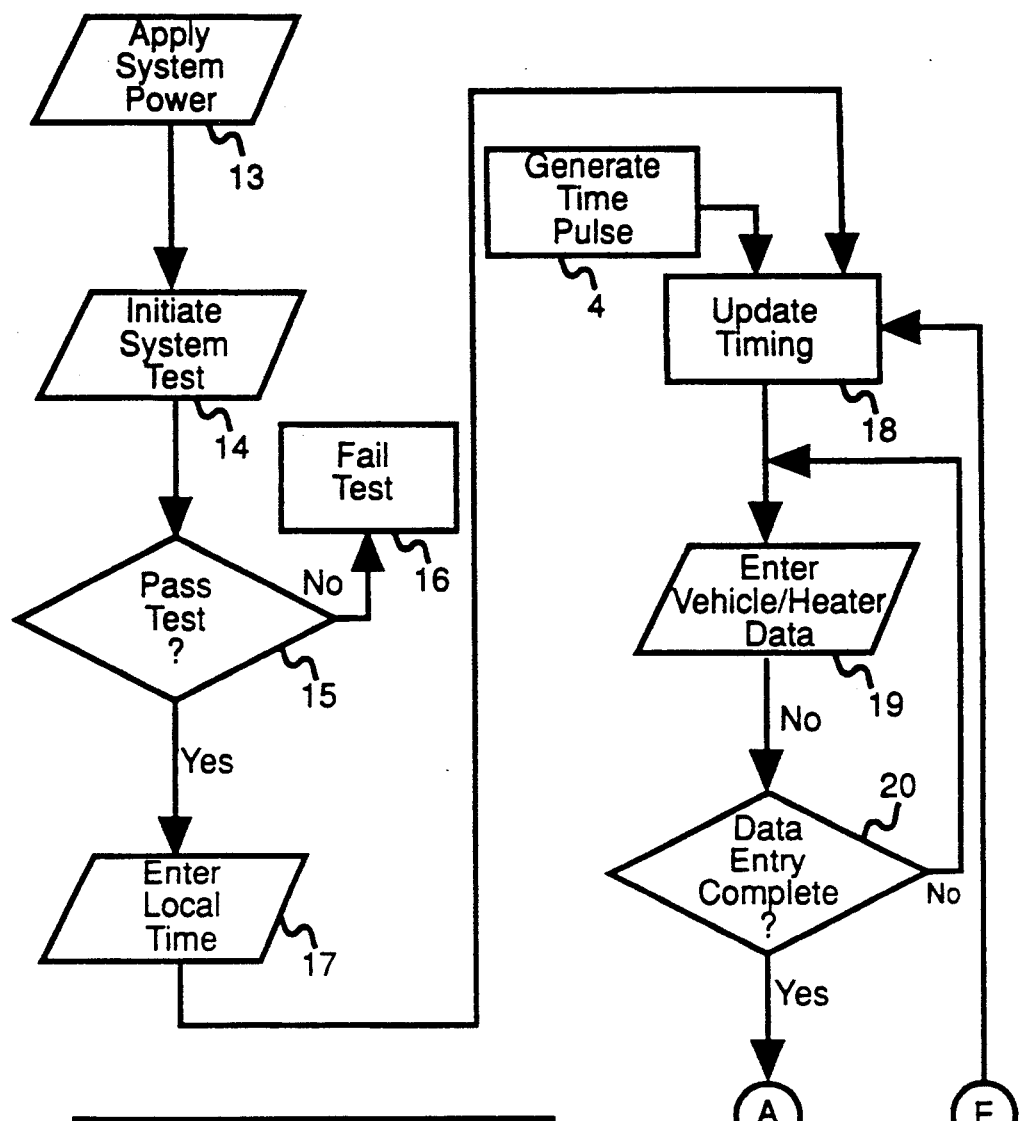
FIG. 2A, 2B and 2C are flow charts showing all actions required of the user and the controller and the logic and information flows necessary to achieve the objectives described in the summary of the invention.

To activate the controller for the first time, the user carries out functions 13 and 14 of FIG. 2A. Power is applied to all elements of the controller through the master power switch 12 of FIG. 1. The system test, function 14, tests all controller functions from temperature sensing 2 to heater current switching 10. The display will show a fail symbol 16, should there be a failure of any test. If the tests are successfully accomplished, the user enters local time 17 into the system. The update timing function 18 then accepts timing pulses at regular intervals from the time pulse generator 4 and maintains local time as long as the power supply is operational. The update timing function 18 also controls the temperature measurement time intervals necessary for computation of expected future temperatures, reads the most recent temperature measurement into the temperature array file, and updates the "day" specification of next use time at the end of each 24 hour period.

At this point in the start-up procedure the controller operational program waits for entry of vehicle-heater-specific data 19. These data include vehicle designation number, the next use time of the heater and the heater parameter for each vehicle connected to the controller. The preferred embodiment of our invention anticipates the probability that an engine component of a vehicle may have heating parameters incompatible with the other components of a vehicle and provides for a separate entry of a heating parameter for such a component. The heater of such a component will be connected to a separate channel designated by the user. The user than enters the heating parameter for the component and the next use time of the vehicle, which will be the same as the next use time specified for the other components of the vehicle. The initiation and duration of heating for the unique component will be conducted independently of the other engine components of the vehicle.

Figure 2B:
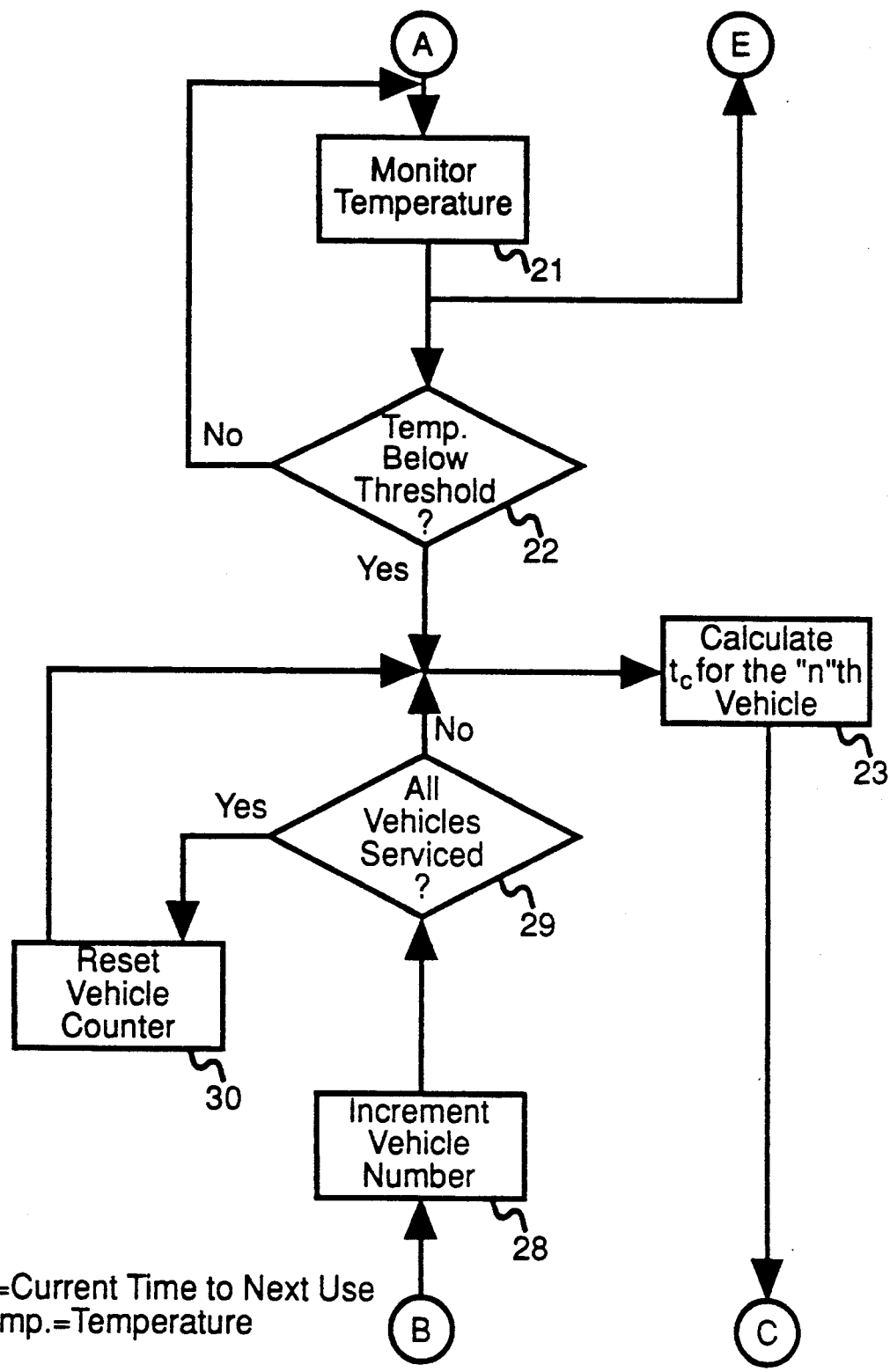

When data entry is complete 20, the program begins the repetitive process of monitoring the ambient temperature 21, FIG. 2B, as long as the measured temperature is above the temperature threshold 22, which is typically set at 10 degrees Fahrenheit above zero.

Figure 2C:
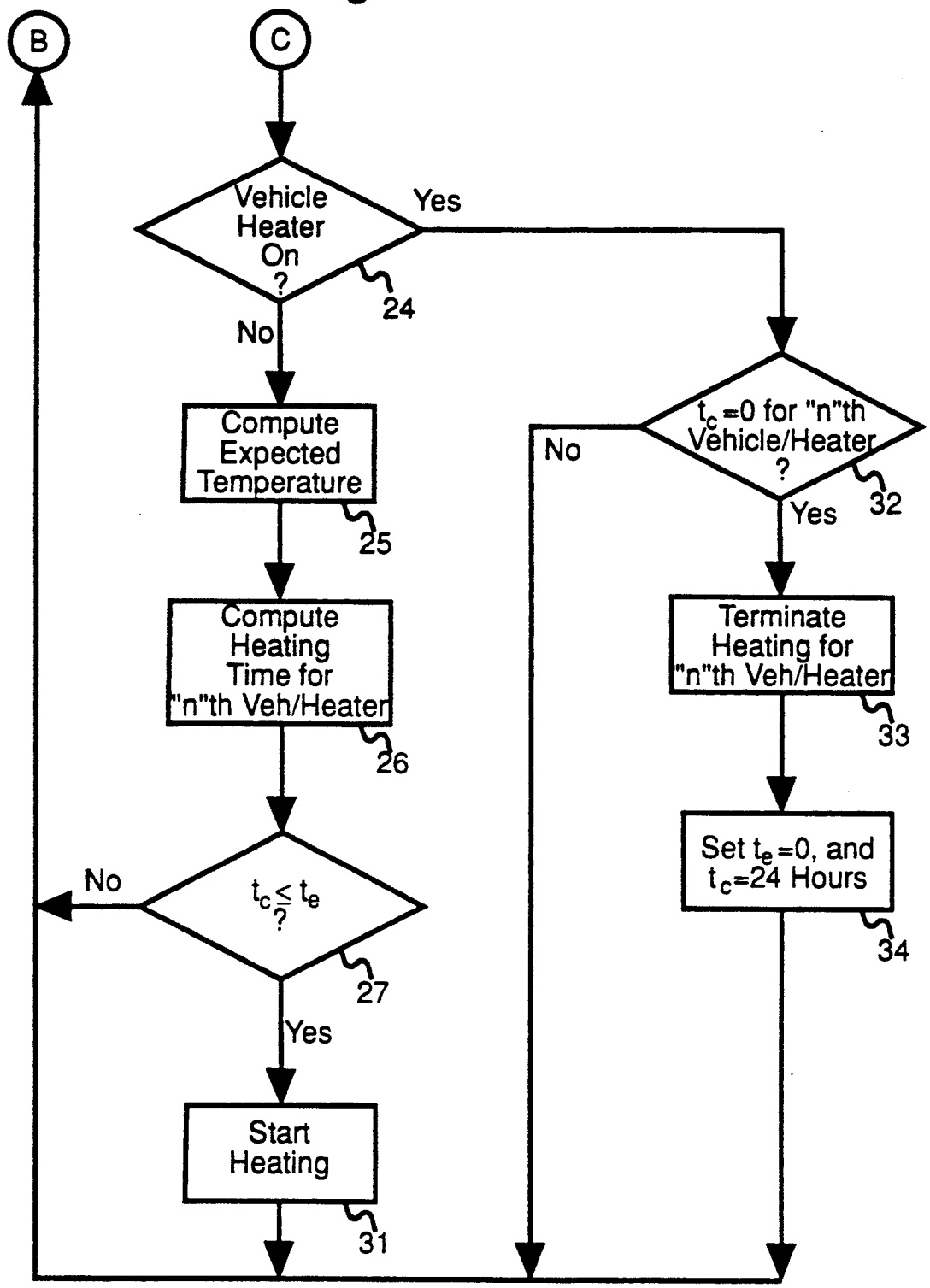

The operational program initiates the servicing sequence for each heater connected to the controller, starting with the heater of the first numbered vehicle when the temperature 21 drops below the temperature threshold 22. The first function to be executed is the computation of the current time to next use 23 which is defined as the difference between the actual or local time and the time the vehicle will next be used. The computed current time to next use is stored in the RAM 6 vehicle file at the address appropriate to the number of the vehicle being serviced. The program then branches to the execute the heating control logic and computations of FIG. 2C. The heater for each vehicle connected to the controller sequences through all the functions of FIG. 2C in accordance with the logic discussed below. Functions 28, 29 and 30 of FIG. 2B serve as a vehicle "pointer" to identify the number of the vehicle being serviced. All user input data and computed products stored in the RAM vehicle file are addressed relative to the number of the vehicle.

The program advances to determine the component heating status 24 of the vehicle "pointed to" by the vehicle pointer of functions 28, 29 and 30 of FIG. 2B after computing the current time to next use 23. The component heating status is determined from the ambient temperature and the time to next use and can result in the component either being heated or not being heated. Heating is initiated 31 when the ambient temperature is less than temperature threshold 22 of FIG. 2B and when the current time to next use is less than or equal to the component heating time 26.

The microprocessor 7 initiates component heating 31 by transmitting a heating command and a vehicle selected code to the select logic 8. Select logic 8 then activates the appropriate optical coupler 9 which, in turn, activates the gate circuit of the current switch 10 to start current flow through the heater. The program then branches to increment the vehicle "pointer", functions 28, 29 and 30 of FIG. 2B, to initiate servicing the next numbered vehicle. The next time the program will determine that the components are being heated and will branch to function 32.

If, when determining the heating status of a vehicle 24, the expected ambient temperature at next use is less than the threshold temperature and the component heating time is less than the current time to next use, the component is not being heated. The program then advances to functions 25, 26 and 27 which compute, respectively, the expected ambient temperature at the next use time, the component heating time and whether or not heating of the component should commence. If heating is to begin, then the conditions described in the previous paragraph have been met and those steps associated with the initiation of heating will be carried.

Heating of a component will continue once it has been initiated until the current time to next use is zero 32 regardless of the ambient temperature. When the current time to next use decrements to zero, function 32, the program advances to functions 33 and 34 to terminate component heating. A stop heating command is then transmitted to the vehicle select logic 8 by the microprocessor 7. The select logic 8 decodes the vehicle number and deactivates the appropriate optical coupler 9 which, in turn, deactivates the gate circuit of the current switch 10, terminating component heating 33. After component heating termination 34, the current time to next use is set to 24 hours and the heating time is set to zero for the vehicle being serviced. The program then branches to increment the vehicle pointer, functions 28, 29 and 30 to service the engine components of the next vehicle.

At the completion of heating the user disconnects the component heater of the vehicle from the controller and puts the vehicle into service. If the channel is reserved for a vehicle entering service at the same time each day, the user then simply reconnects the heater of the vehicle to the controller channel when the vehicle returns from service. No data is entered into the controller, since the operational program stores the next use time of the vehicle in the vehicle/heater file. The user may connect component heaters of another vehicle with a next use time different from that of the previous vehicle to the now empty channel. However, the user must then enter the number of the new vehicle and its next use time into the controller.

The above description shows the operational program control logic of the controller. The method and derivation of the functions for expected temperature at next use time 25 and the theory supporting the derivation of the heating time computation function 26 are shown below.

An estimate of ambient temperature at next use time is necessary to compensate for a changing air temperature prior to initiation of component heating. The expected temperature at next use time 25 of the vehicle being serviced is estimated by measuring and recording the ambient temperature at regular intervals from the time the ambient temperature drops below the temperature threshold. These temperature measurements re accumulated and stored in a file in the RAM 6. An average rate of temperature change is computed over a period of time, typically 2 hours. The average rate of temperature change is then multiplied by the current time to next use for the vehicle being serviced and the product is then added to the latest temperature measurement stored in the array. The result is expected temperature at next use time of the vehicle. A new temperature is stored in the temperature array and the earliest temperature dropped from the array typically every 15 minutes. This provides an estimate of the temperature at next use time that is based on the rate of temperature change during the two hours and the current time to next use. However, different time periods and update intervals could be used without affecting the spirit and scope of this invention.

Figure 3:
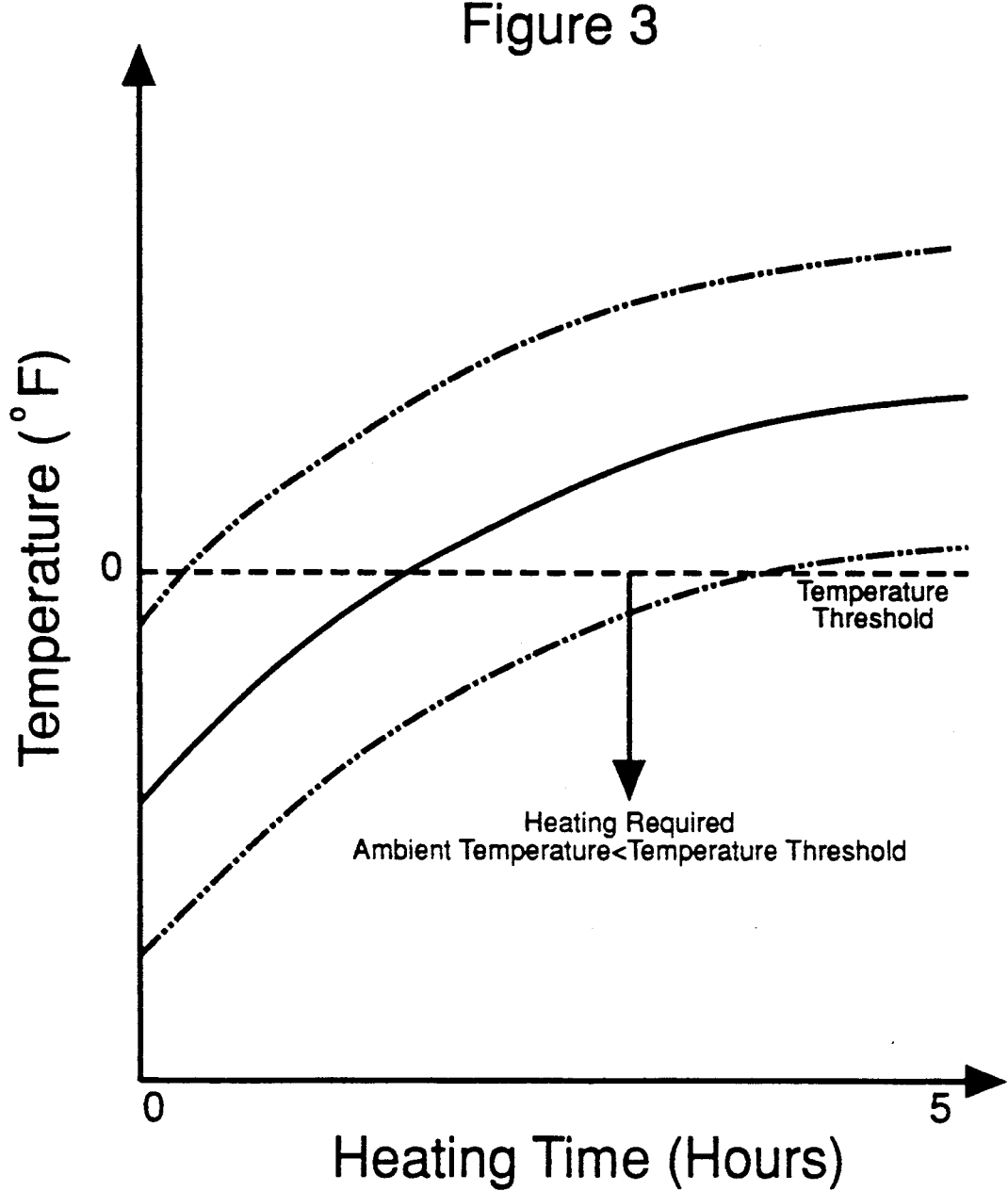
FIG. 3 shows the rate of temperature change of an object through the conduction of heat energy from a source. A family of such curves illustrates the heating time differences of an object for various initial temperature conditions. The lower the initial temperature, the longer the time that is required for the object to reach the threshold temperature. The temperature threshold is the temperature above which heating is not required.

The compute the component heating time 26, a function is derived from the theory of heat conduction to determine the heating time required for an object to achieve a specified temperature rise above an ambient temperature. The form of this function was described in the summary and is shown in FIG. 3. Expressing this exponential function in its equivalent logarithmic form allows time to be written as the dependent variable in terms of the ambient temperature, the final or steady state temperature and the temperature threshold. This equation has the form:

$$t = \tau[\ln(T_F - T_l)/(F_F - T_l)]$$

where $\tau$ is the time constant and $t_l$ is a constant representing the temperature threshold. Definitions of the other terms in the equation were previously described in the summary discussion of this invention.

According to the manufactuer's of engine component heaters, the difference between the final temperature and the initial temperature of the object is dependent on the initial temperature. This relationship may be expressed as $T_F = F_{FO} + mT_I$. In the preferred embodiment $m = 1.33$ and $T = 60$ degrees Fahrenheit, since $T_F - T_I = 60$ degrees Fahrenheit at an initial temperature of zero degrees Fahrenheit and 50 degrees Fahrenheit at an initial temperature of $-30$ degrees Fahrenheit. Substituting this linear expression for the object final temperature into the above logarithmic equation allows an expression for the heating time of an object to be written in terms of the initial temperature, $T_I$, since $T_I$ is the temperature threshold constant of 10 degrees above zero Fahrenheit. An approximation of the logarithmic relationship for the object heating time in terms of the object initial temperature may be expressed as a polynomial by one of several methods available in the literature for approximating logarithmic functions.

In summary, our invention uses readily available electric heating devices in a manner which will independently preheat a plurality of temperature sensitive components for internal combustion engines in vehicles operating in cold climates, when the heating devices are installed as specified by the manufacturer. The initiation and duration of heating is automatically controlled such that the user realizes reduced energy cost while at the same time ensuring that the engine components are at the proper temperatures at their next use. To compensate for changes in ambient temperature prior to the initiation of component heating for each vehicle, an estimate is made of the expected temperature at next use time to up-date the component heating time for each vehicle. Our invention uses well known physical principles of heat conduction along with manufacturers' heater information to relate ambient temperature conditions to the length of time that heating is required for engine components. This approach eliminates the need for a closed loop temperature control or regulating system which requires that temperature sensors be mounted on or in the components being heated. Finally, our invention does not require data entries for vehicles entering daily service at a fixed time.

We claim:

1. A method of controlling the timing of the application of electrical energy to heaters attached to engine components of commercial and residential vehicles for the purpose of preheating the engine component for use in climates where the temperature may range to $-60$ degrees Fahrenheit, with the termination of heating timed to coincides with time of use of the said vehicle; said method comprising
   1. a air temperature sensor to measure the ambient air temperature which is taken to be the temperature of the said components prior to the start of heating;
   2. a clock means to maintain controller local time;
   3. A switching means to apply electrical power from a current source to a plurality of vehicles with engine component heaters;
   4. a processor means
      a. enabling the user to enter vehicle use time and heater parameters for each vehicle and enable entry of local current time;
      b. enabling the measured air temperature to be stored and monitored through time in order to estimate the future ambient temperature at the vehicle time of use for each vehicle;
      c. controlling and monitoring, in accordance with stored program instructions of the microprocessor, heating status and the application of power to the component heaters in each vehicle;
      d. controlling the switching of the vehicle selector to apply or terminate electrical current to engine component heaters of each vehicle.

2. A method according to claim 1 wherein for step 1 the temperature sensor further comprises associated devices that allow the ambient temperature to be detected by said processing means.

3. The method according to claim 1, wherein the clock means of step 2 further comprises a pulse generating means that provides accurate time pulse markers to the processing means which in combination with the said clock reference provides controller local time.

4. The method according to claim 1 wherein the data entry method of step 4a further comprises a device that allows the user to enter vehicle-specific data such as vehicle identification parameters, vehicle time of use and electric heater parameters and said local time reference.

5. A method of claim 4 further comprising a device for display vehicle identification parameters, vehicle time of use, current time remaining to the time of vehicle use and electric heater parameters.

6. A method of claim 1 wherein the processing means of step 4 further comprises:
   a. a read only memory for storing instructions for the controller operational program and data which includes said electric heater parameters;
   b. a random access memory, providing a read and write capability, which stores said ambient temperature and the rate of change of said ambient temperature and vehicle-specific data for each vehicle;
   c. a microprocessor for controlling the processing of all data in accordance with the said operational program instructions and controlling the input/out access to all peripheral devices such as the temperature sensor, data inputs and display, timing markers and the electric heater switching circuits.

7. The method of claim 6 wherein the combination of the microprocessor, read only memory and random access memory further comprises means of
   a. computing current local time;
   b. computing current time remaining to the time of use of said vehicle by subtracting the time of use for each vehicle from the local time;
   c. estimating the expected ambient temperature at the time of use for each vehicle by multiplying the rate of change of said ambient temperature by the time remaining to the vehicle time of use and adding the product to the current ambient temperature, wherein the rate of change of ambient temperature is calculated from a plurality of ambient temperature measurements made at evenly spaced time intervals prior to the current local time;
   d. computing the length of time that power should be applied to the electric heater of the said engine components of the said vehicle in accordance with a general expression derived from heat conduction theory which has the form $$t = \tau \ln \frac{(T_F - T_I)}{(T_F - T_t)}$$

where t is the heating time, $\tau$ is the time constant of the said engine components being heated, $T_F$ is the final temperature of the engine components. $T_I$ is the initial temperature of the said components and $T_t$ is the desired temperature at time of use of the vehicle and, since the temperature change, $T_F-T_1$, is temperature-dependent, a second relationship is required which has the form $$T = T_{F0} + mT_I$$

where m and $T_{F0}$ are constant parameters determined from manufacture's data for electric heaters;

8. The method of claim 1 wherein the processing means of step 4c further comprising:
   a. a means of determining if said engine component heating should be on and, if so, causes said current switching means to said component to be turned on; and
   b. if the said engine component is being heated, a means of determining whether the heating should be terminated and, if it should, terminate heating of the said engine components.

9. The method of claim 1 wherein step 4d further comprises:
   a. a plurality of switching means for independently switching each said engine component electric heater on or off;
   b. a selector means, in combination with said microprocessor and said memory means, for selecting from a plurality of switching means a single switching means to be independently turned on or off.

10. The method of claim 1 wherein the switching means of step 3 further comprises a means for electrically isolating the circuit by which said microprocessor communicates with said switching means from the electric heater current switching circuits.

* * * * *

UNITED STATES PATENT AND TRADEMARK OFFICE
CERTIFICATE OF CORRECTION

PATENT NO. : 5,280,158                          Page 1 of 2
DATED      : January 18, 1994
INVENTOR(S): Stephen J. Matava, et al It is certified that error appears in the above-indentified patent and that said Letters Patent is hereby corrected as shown below:

On the title page item [76] change the first inventors address to read:

3648 113th Ave NE
Bellevue, Wa. 98004

Col. 1, Line 64, replace the word "easily" with the word "early".

Col. 5, line 60, move the contents of line 60 to line 59 and move Lines 59 and 60 into the space provided by lines 60 and 61 without changing the sequence of the words.

Col. 6, line 34, insert the phrase "checks to determine the status 24 of this vehicle the program "between the words "program" and "will" of the sentence that begins with "The next time the program....".

UNITED STATES PATENT AND TRADEMARK OFFICE
CERTIFICATE OF CORRECTION

PATENT NO. : 5,280,158
DATED : January 18, 1994
INVENTOR(S) : Stephen J. Matava, et al It is certified that error appears in the above-indentified patent and that said Letters Patent is hereby corrected as shown below:

Col. 7, Line 63, replace the equation "$T_F = F_{FO} + mT_I$" with equation "$T_F = T_{FO} + mT_I$".

Col. 7, Line 64, replace equation "$T = 60$" with the equation "$T_{FO} = 60$".

Col. 10, Line 20, replace equation "$T = T_{FO} + mT_I$" with equation $T_F = T_{FO} + mT_I$.

Signed and Sealed this

Twenty-first Day of February, 1995

Attest:

BRUCE LEHMAN

*Attesting Officer*   *Commissioner of Patents and Trademarks*